United States Patent
Siddoway et al.

(10) Patent No.: US 10,317,926 B2
(45) Date of Patent: Jun. 11, 2019

(54) METHOD AND APPARATUS FOR CONTROLLING AN ELECTRONIC DEVICE USING A ROTARY CONTROL

(71) Applicant: MOTOROLA SOLUTIONS, INC., Schaumburg, IL (US)

(72) Inventors: Craig F Siddoway, Davie, FL (US); Chul Min Kang, Gyunggi-do (KR); Cheah Chan Kee, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 597 days.

(21) Appl. No.: 15/053,457

(22) Filed: Feb. 25, 2016

(65) Prior Publication Data
US 2017/0248985 A1 Aug. 31, 2017

(51) Int. Cl.
| G05G 1/12 | (2006.01) |
| G05B 15/02 | (2006.01) |
| G01D 3/10 | (2006.01) |
| G05G 1/10 | (2006.01) |
| G01D 5/20 | (2006.01) |

(52) U.S. Cl.
CPC ............... *G05G 1/12* (2013.01); *G01D 3/10* (2013.01); *G05B 15/02* (2013.01); *G05G 1/10* (2013.01); *G01D 5/20* (2013.01)

(58) Field of Classification Search
CPC . G01D 3/10; G01D 5/20; G01B 15/02; G01G 1/10; G01G 1/12; G05G 1/12; G05G 1/10; G05B 15/02
USPC .................. 700/17, 83–85; 345/156–184
See application file for complete search history.

(56) References Cited

U.S. PATENT DOCUMENTS
| 4,567,763 A | 2/1986 | Schiffbauer |
| 5,491,507 A * | 2/1996 | Umezawa ........... H04M 1/0247 348/14.02 |
| 5,598,090 A | 1/1997 | Baker et al. |
(Continued)

FOREIGN PATENT DOCUMENTS
GB 2361292 10/2001

OTHER PUBLICATIONS

PCT/US2017/015251 International Search Report and Written Opinion of the International Searching Authority dated Apr. 24, 2017 (16 pages).

*Primary Examiner* — Gene N Auduong
(74) *Attorney, Agent, or Firm* — Michael Best & Friedrich LLP

(57) ABSTRACT

A method and apparatus for controlling an electronic device using a rotary control. The method includes receiving, by an electronic processor from an inductance sensor, a first inductance. The method further includes comparing, by the electronic processor, the first inductance to a first threshold. The method further includes, determining, by the electronic processor, a location for the rotary control when the first inductance exceeds the first threshold, the method further includes activating, by the electronic processor, a control function based on the location. The method further includes receiving, by the electronic processor from the inductance sensor, a second inductance. The method further includes determining, by the electronic processor, a delta based on the first inductance and the second inductance. The method further includes adjusting, by the electronic processor, the control function based on the delta.

16 Claims, 14 Drawing Sheets

(56) References Cited

U.S. PATENT DOCUMENTS

| | | | | |
|---|---|---|---|---|
| 5,936,613 A | * | 8/1999 | Jaeger | G06F 3/0238 345/172 |
| 5,959,611 A | * | 9/1999 | Smailagic | G06F 1/163 341/22 |
| 6,225,980 B1 | * | 5/2001 | Weiss | G06F 3/0362 345/156 |
| 6,532,035 B1 | * | 3/2003 | Saari | G02B 13/005 348/14.01 |
| 6,992,699 B1 | * | 1/2006 | Vance | H04N 7/142 348/207.99 |
| 7,148,880 B2 | | 12/2006 | Magara | |
| 7,485,819 B2 | | 2/2009 | Reischl et al. | |
| 7,565,181 B1 | * | 7/2009 | Hans | H04W 4/12 455/574 |
| 8,921,719 B2 | | 12/2014 | Suzuki | |
| 8,925,414 B1 | | 1/2015 | Park et al. | |
| 8,938,161 B2 | | 1/2015 | Webb et al. | |
| 9,122,298 B2 | | 9/2015 | Kern | |
| 2008/0108869 A1 | * | 5/2008 | Sanders | A61B 1/00105 600/109 |
| 2011/0098833 A1 | * | 4/2011 | Seflic | G06F 3/01 700/94 |
| 2012/0293115 A1 | | 11/2012 | Ramsesh | |
| 2013/0276572 A1 | | 10/2013 | Vogt | |
| 2014/0090504 A1 | | 4/2014 | Huth | |

\* cited by examiner

METHOD AND APPARATUS FOR CONTROLLING AN ELECTRONIC DEVICE USING A ROTARY CONTROL

BACKGROUND OF THE INVENTION

Electronic devices, for example, portable two-way radios, use rotary switches to activate and control various functions, such as volume and channel control. As electronic devices decrease in size, it is increasingly difficult to locate multiple switches or rotary control knobs on a single device. Locating the controls near one another makes it difficult for users to manipulate them. For example, a user attempting to activate one control may inadvertently activate an adjacent control. In addition, including multiple rotary controls may lead to inefficient use of space within electronic devices. Multifunction rotary controls take less space than multiple controls, but do not clearly identify which function they are controlling.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
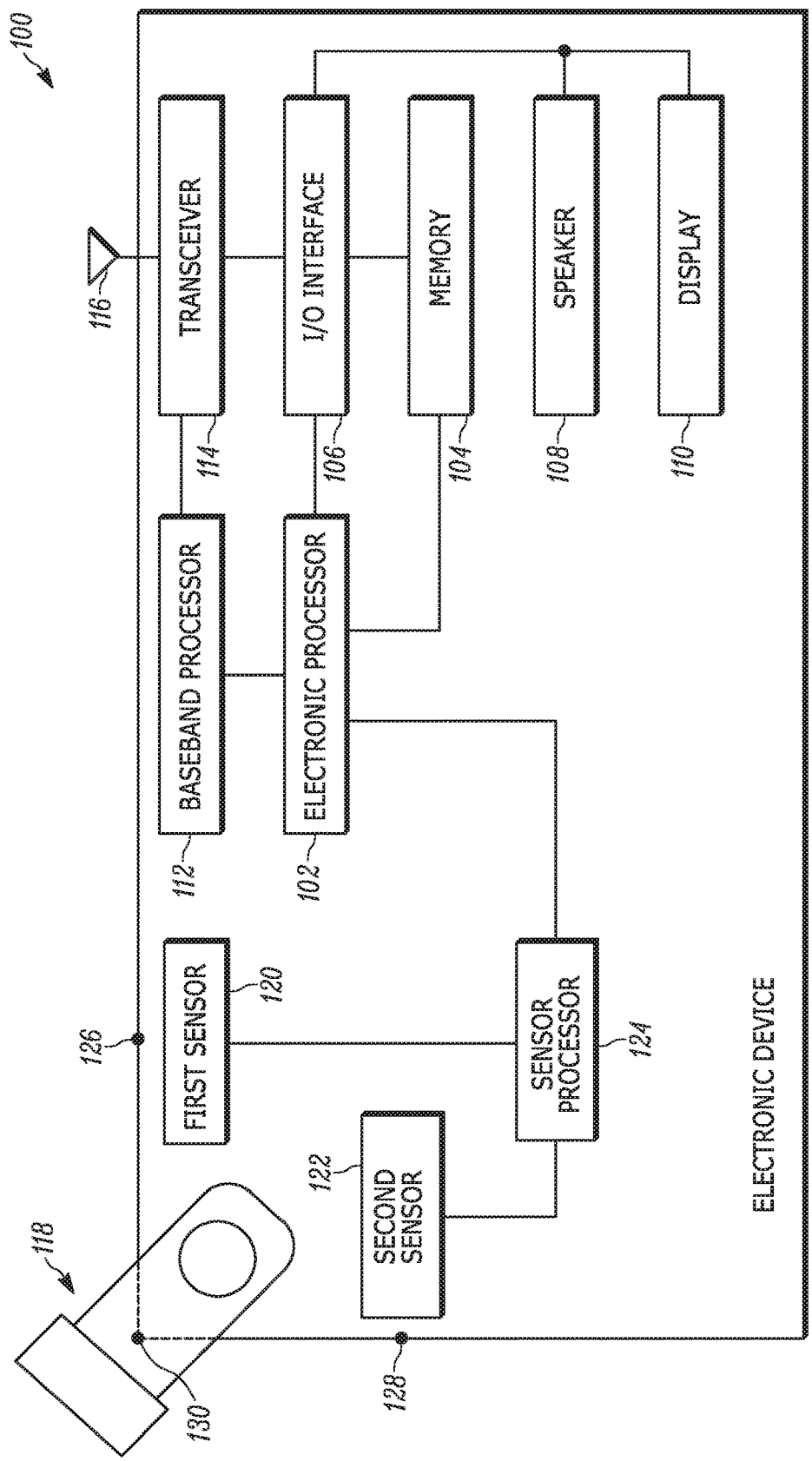
FIG. 1 is a block diagram of an electronic device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One exemplary embodiment provides a rotary control for an electronic device. The rotary control includes a knob having a longitudinal axis. The knob is movable between a first location and a second location and rotatable around the longitudinal axis. The rotary control further includes a first sensor located at the first location and configured to sense when the knob is in the first location. The rotary control further includes a second sensor located at the second location and configured to sense when the knob is in the second location.

Another exemplary embodiment provides a method for controlling an electronic device using a rotary control. The method includes receiving, by an electronic processor from an inductance sensor, a first inductance. The method further includes comparing, by the electronic processor, the first inductance to a first threshold. The method further includes, determining, by the electronic processor, a location for the rotary control when the first inductance exceeds the first threshold. the method further includes activating, by the electronic processor, a control function based on the location. The method further includes receiving, by the electronic processor from the inductance sensor, a second inductance. The method further includes determining, by the electronic processor, a delta based on the first inductance and the second inductance. The method further includes adjusting, by the electronic processor, the control function based on the delta.

FIG. 1 is a block diagram of an electronic device 100 according to one exemplary embodiment. In the example illustrated, the electronic device 100 includes an electronic processor 102 (e.g., a microprocessor or another suitable programmable device), a memory 104 (e.g., a computer-readable storage medium), an input/output interface 106, a speaker 108, a display 110, a baseband processor 112 (for example, a network modem), a transceiver 114, an antenna 116, a knob 118, a first sensor 120, a second sensor 122, and a sensor processor 124. In a number of the embodiments described herein, the electronic device 100 is a portable two-way radio. However, in alternative embodiments, the electronic device 100 may be a cellular telephone, a smart telephone, a mobile radio, a smart watch, a tablet computer, a personal digital assistant (PDA), or other electronic device.

The electronic processor 102, the memory 104, the input/output interface 106, the speaker 108, the display 110, the baseband processor 112, the transceiver 114, the antenna 116, the first sensor 120, the second sensor 122, and the sensor processor 124, as well as other various modules and components, are coupled to each other by or through one or more control or data buses, which enable communication therebetween. The use of control and data buses for the interconnection between and exchange of information among the various modules and components would be apparent to a person skilled in the art in view of the description provided herein. The electronic processor 102 controls the other components of the electronic device 100. The electronic processor 102 obtains and provides information (for example, from the memory 104 and/or the input/output interface 106), and processes the information by executing one or more software instructions or modules, capable of being stored, for example, in a random access memory ("RAM") area of the memory 104 (for example, during execution) or a read only memory ("ROM") of the memory 104 (for example, on a generally permanent basis) or another non-transitory computer readable medium. The software can include firmware, one or more applications, program data, filters, rules, one or more program modules, and other executable instructions. The electronic processor 102 retrieves from the memory 104 and executes, among other things, software related to the control processes and methods described herein.

The memory 104 can include one or more non-transitory computer-readable media, and includes a program storage area and a data storage area. The program storage area and the data storage area can include combinations of different types of memory, as described herein.

The input/output interface 106 receives input from, for example, a user of the electronic device 100, provides system output, or a combination of both. The input/output interface 106 obtains information and signals from, and provides information and signals to, (for example, over one or more wired and/or wireless connections) devices both internal and external to the electronic device 100. Outputs, for example, may be provided via the speaker 108 and the display 110. The speaker 108 is a transducer for reproducing sound from electrical signals received from the electronic processor 102 via the input/output interface 106. The speaker 108 is conventional, and will not be described in detail. The display 110 is a suitable display device such as, for example, a liquid crystal display (LCD), or an organic light-emitting diode (OLED) touch screen. Alternative embodiments may include other output mechanisms such as, for example, haptic feedback motors and light sources (not shown). Input may be provided via, for example, a keypad, a microphone, soft keys, icons, or soft buttons on the display 110, a scroll ball, buttons, and the like. The input/output interface 106 may include a graphical user interface (GUI) (for example, generated by the electronic processor 102, from instructions and data stored in the memory 104, and presented on the display 110) that enables a user to interact with the electronic device 100.

The baseband processor 112 encodes and decodes digital data, including voice communications, sent and received by the transceiver 114. The electronic processor 102 controls the transceiver 114 to send and receive data to and from various wireless communications and data networks such as, for example, a land-mobile radio (LMR) network (not shown), via the antenna 116.

The knob 118 is a rotary knob affixed to or, in some embodiments, removably coupled to the electronic device 100. The knob 118 is pivotable between a first location 126, a second location 128, and a third location 130, which is located between the first location 126 and the second location 128. The knob 118 and its operation are described below in greater detail.

The first sensor 120 is a transducer that detects changes in a characteristic (for example, inductance or capacitance) of the environment near the transducer, and produces electrical signals (for example, an alternating current) proportional to the detected changes. The first sensor 120 is positioned such that, when the knob 118 is at the first location 126, the rotation of the knob 118 causes changes, which can be detected by the first sensor 120. The first sensor 120 is also positioned such that the rotation of the knob 118 cannot be detected by the first sensor 120 when the knob 118 is in the second location 128 or the third location 130.

The second sensor 122 is substantially similar to the first sensor 120 and configured to detect changes in the same characteristic as the first sensor 120. The second sensor 122 is positioned such that, when the knob 118 is at the second location 128, the rotation of the knob 118 causes changes, which can be detected by the second sensor 122. The second sensor 122 is also positioned such that the rotation of the knob 118 cannot be detected by the second sensor 122 when the knob 118 is in the first location 126 or the third location 130.

The sensor processor 124 is electrically coupled to the electronic processor 102, the first sensor 120, and the second sensor 122. The sensor processor 124 includes suitable electronic components (for example, amplifiers, analog to digital converters, and digital signal processors) for processing electrical signals received from the first sensor 120 and the second sensor 122 and communicating those signals to the electronic processor 102. Although not shown, the electronic device 100 may include a third sensor to sense when the knob 118 is at the third location 130. The third sensor may be electrically coupled to the sensor processor 124. However, a third sensor is not required. If neither of the first sensor 120 and the second sensor 122 sense the presence of the knob 118, the electronic processor may be configured (for example, programmed) to assume that the knob 118 is in the third location 130.

In embodiments described herein, the first sensor 120 and the second sensor 122 are inductance sensors and the sensor processor 124 is an inductance-to-digital converter (LDC). In some embodiments, the first sensor 120, the second sensor 122, and the sensor processor 124 may be configured to sense changes in another characteristic (for example, magnetic flux, capacitance, or resistance). In alternative embodiments, the first sensor 120, the second sensor 122, and the sensor processor 124 may be configured to optically sense the rotation of the knob 118.

Figure 2A:
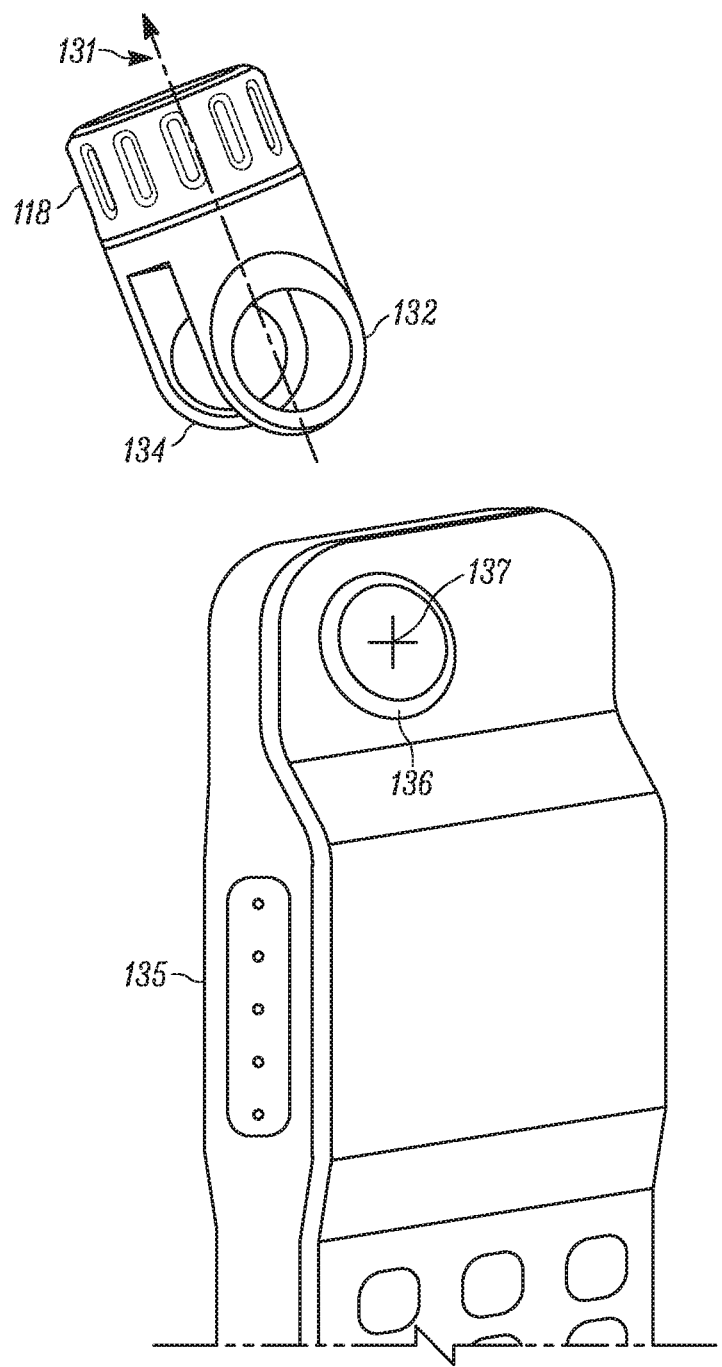
FIG. 2A is a perspective view of a pivotable knob and an electronic device in accordance with some embodiments.
Figure 2B:
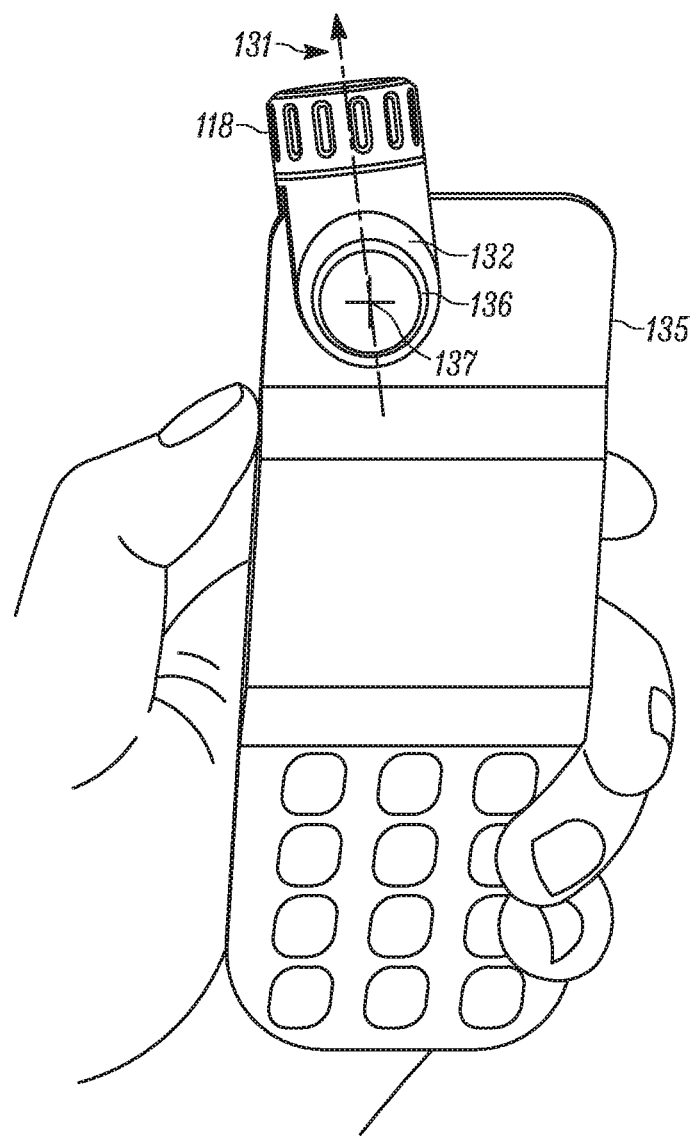
FIG. 2B is a perspective view of the pivotable knob of FIG. 2A attached to the electronic device of FIG. 2A in accordance with some embodiments.

As illustrated in FIG. 2A, the knob 118 includes a longitudinal axis 131, a first boss 132, and a second boss 134. The knob 118 freely rotates around the longitudinal axis 131. Also illustrated in FIG. 2A, is an exemplary embodiment of a housing 135 of the electronic device 100. The housing 135 includes a pin 136. In one exemplary embodiment, the pin 136 is a cylindrical body that includes a pivot axis 137. The pin 136 is positioned perpendicular to, and extends through, the housing 135. In some embodiments, the pin 136 is integral to the housing 135. In other embodiments, the pin 136 does not extend through the housing 135, but is made up of two substantially identical circular protrusions located coaxially (along the pivot axis 137) to each other on opposite surfaces of the housing 135. The first boss 132 and the second boss 134 are configured to mate with the pin 136 to affix, and in some embodiments, to removably couple the knob 118 to the housing 135, as illustrated in FIG. 2B.

Figure 2C:
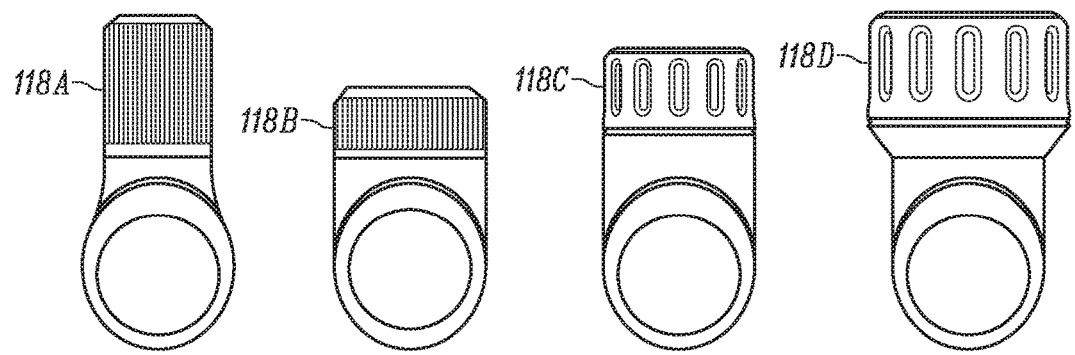
FIG. 2C is a side view of four pivotable knobs in accordance with some embodiments.

For ease of illustration, the knob 118 is shown in a single size and shape. Alternative embodiments include different sizes and shapes of the knob 118. For example, FIG. 2C illustrates knob variations 118A, 118B, 118C and 118D for use with alternative embodiments of the electronic device 100. The variations illustrated are configured to be interchangeably coupled to the pin 136.

Figure 3:
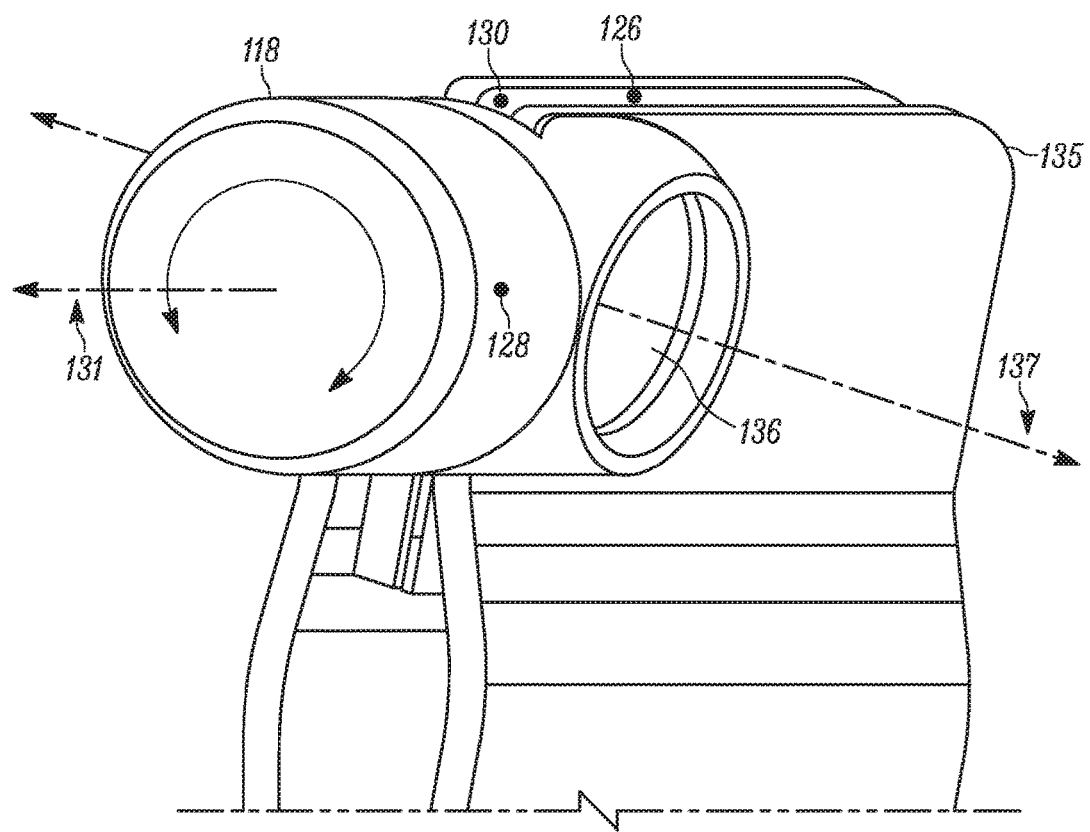
FIG. 3 is a perspective view of a pivotable knob for a rotary control in accordance with some embodiments.

As illustrated in FIG. 3, when coupled to the housing 135 using the pin 136, the knob 118 is pivotable about the pivot axis 137, and rotatable about the longitudinal axis 131. In some embodiments, the knob 118 includes a plurality of detents (not shown) positioned such that the knob 118 rotates around the longitudinal axis in a plurality of equal steps.

Figure 4:
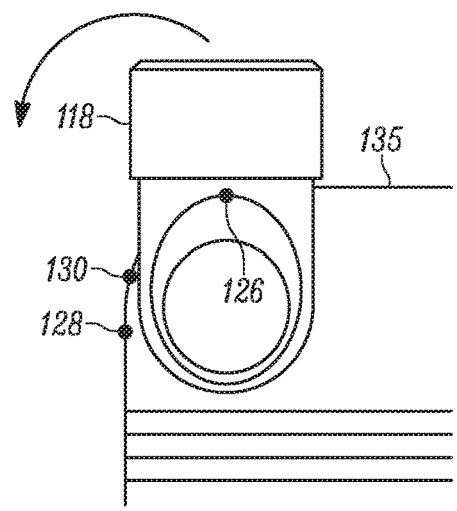
FIG. 4 is a side view of the pivotable knob of FIG. 2, positioned at a first location, in accordance with some embodiments.
Figure 5:
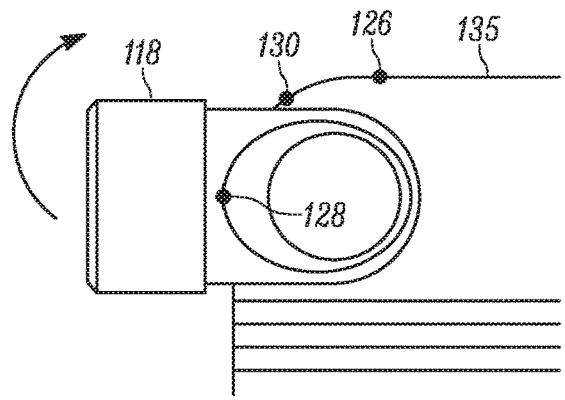
FIG. 5 is a side view of the pivotable knob of FIG. 2, positioned at a second location, in accordance with some embodiments.
Figure 6:
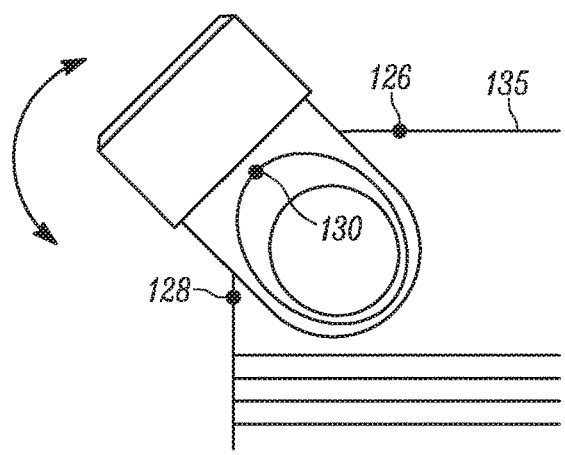
FIG. 6 is a side view of the pivotable knob of FIG. 2, positioned at a third location, in accordance with some embodiments.
Figure 7A:
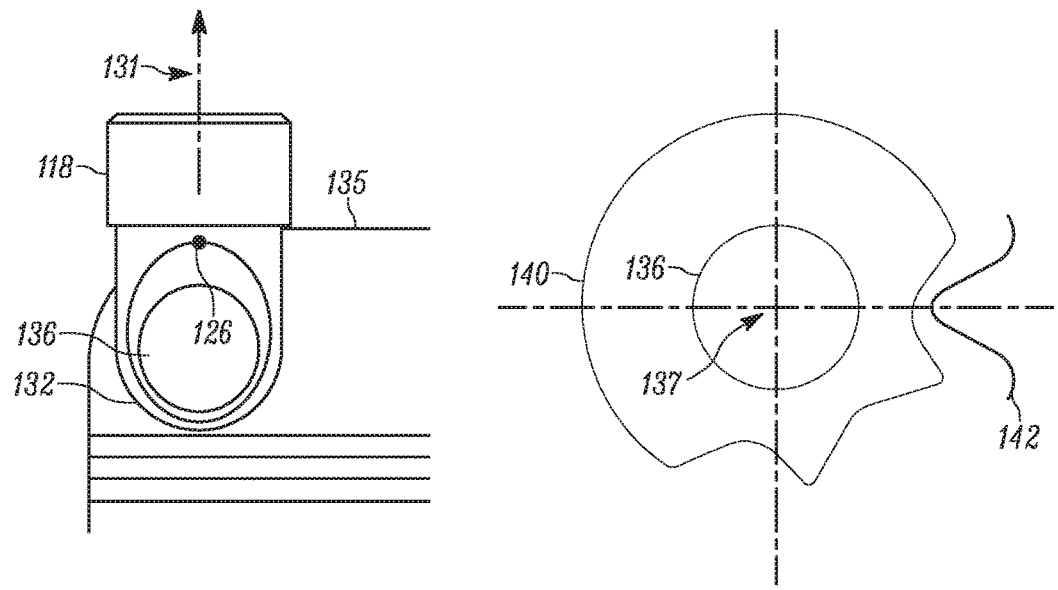
FIGS. 7A through 7C are side views of a mechanism for positioning the pivotable knob of FIG. 2 in the first, second, and third locations, in accordance with some embodiments.
Figure 7B:
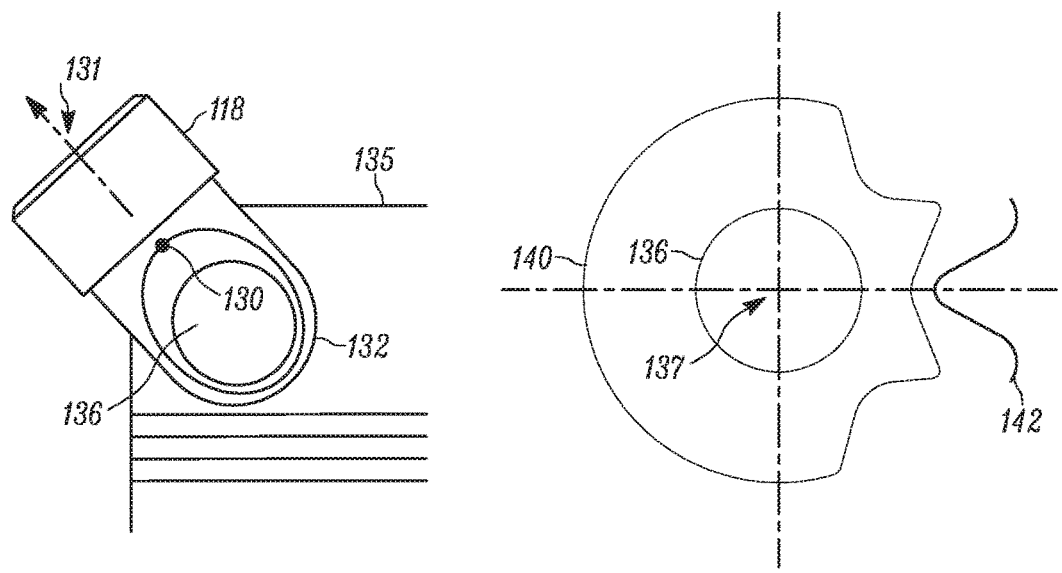
Figure 7C:
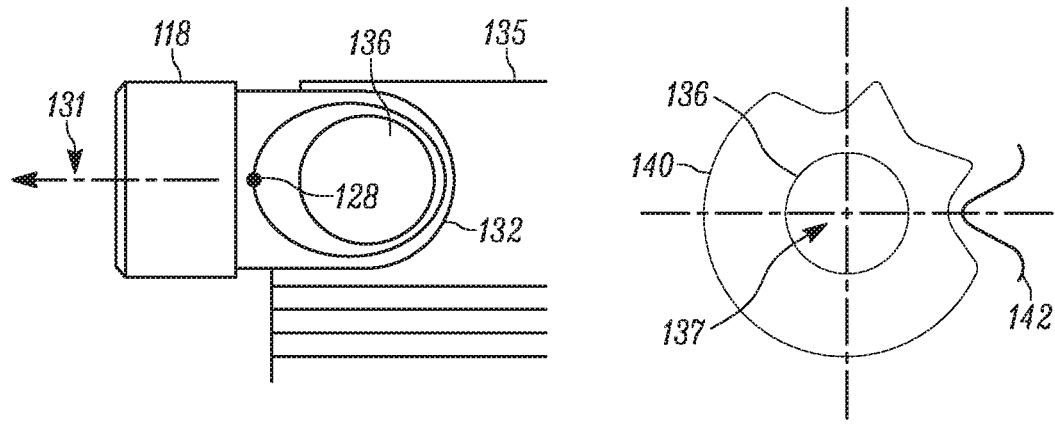

The knob 118 is also pivotable between the first location 126 (FIG. 4), the second location 128 (FIG. 5), and the third location 130 (FIG. 6). As illustrated in FIGS. 7A, 7B, and 7C, one exemplary embodiment includes a cam rocker 140 and a detent spring 142 for keeping the pivotable knob in position. The cam rocker 140 is affixed to the pin 136, and the knob 118, the pin 136. As the pin 136 and the cam rocker 140 rotate on the pivot axis 137, the knob 118 pivots between the first location 126 (FIG. 7A), the third location 130 (FIG. 7B), and the second location 128 (FIG. 7C). At each of the locations, cam rocker 140 engages the detent spring 142, holding the knob 118 at that location until the knob 118 is moved with enough force to overcome the tension of the detent spring 142.

Figure 8:
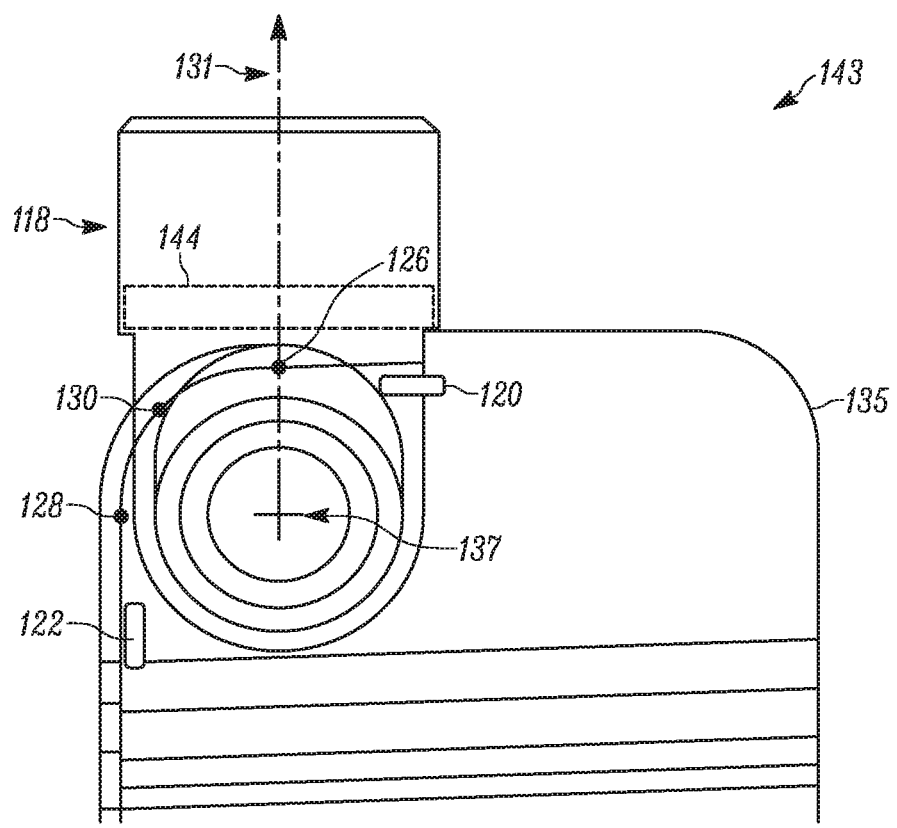
FIG. 8 is a side view of rotary control for an electronic device in accordance with some embodiments.

As illustrated in FIG. 8, components of the electronic device 100 operate together as a rotary control 143. The rotary control 143 includes the knob 118, the first sensor 120, the second sensor 122, and a conductor 144. As illustrated, the knob 118, when at the first location 126, rotates the conductor 144 around the longitudinal axis 131, such that a portion of the conductor passes over the first sensor 120. As described in more detail below, when the conductor 144 rotates at the first location 126, it causes changes in the inductance of the first sensor 120, which are processed by the sensor processor 124 and communicated to the electronic processor 102. Similarly, when the knob 118 is at the second location 128, the conductor 144 rotates around the longitudinal axis 131, such that a portion of the conductor passes over the second sensor 122.

Figure 9:
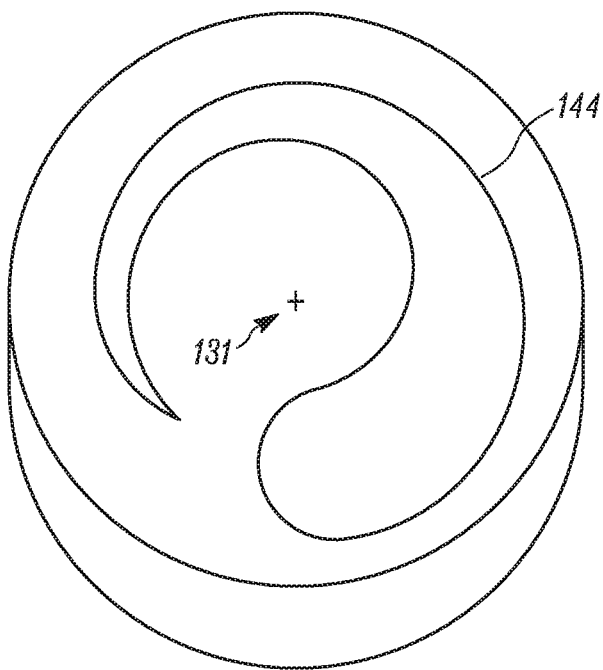
FIG. 9 is a perspective view of a conductor for a rotary control in accordance with some embodiments.

In the illustrated embodiment, the conductor 144 has an annular teardrop shape centered on the longitudinal axis 131 (FIG. 9). More broadly, the conductor 144 may be considered to be an annular conductor. In some embodiments, the conductor is embedded in a disc of non-conductive material (for example, plastic). In some embodiments, the conductor 144 is integral to a rotating portion of the knob 118.

Figure 10:
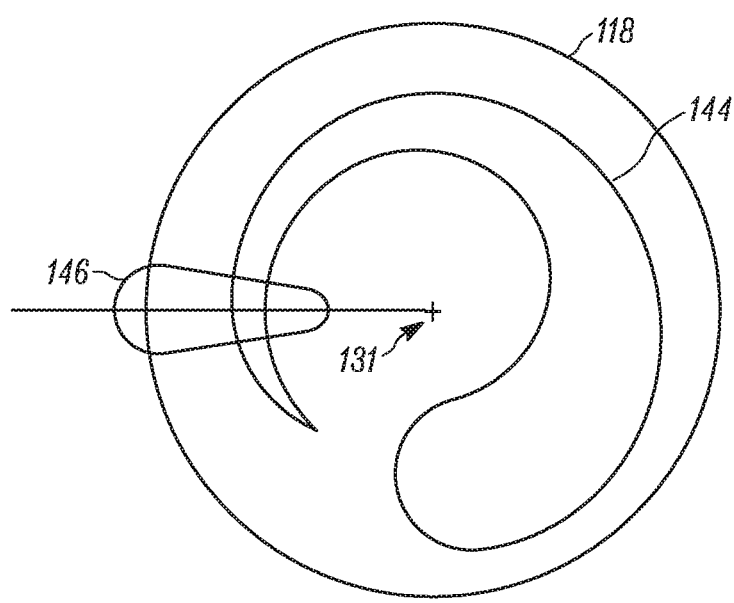
FIG. 10 is a top view of a conductor and an inductive coil for a rotary control in accordance with some embodiments.

FIG. 10 illustrates a top view of the knob 118. As illustrated, the knob 118 rotates around the longitudinal axis 131, moving the conductor over an inductive coil 146. The inductive coil may be the first sensor 120 or the second sensor 122; both function substantially the same way. In the illustrated embodiment, the inductive coil 146 has a teardrop shape. The area of the conductor 144 exposed to the inductive coil 146 increases or decreases as the conductor 144 rotates around the longitudinal axis 131. As the exposed area changes, so does the inductance of the inductive coil 146. The inductive coil 146 is sized proportionally to the conductor 144 such that the changes in inductance can be sensed and used to accurately detect the rotation of the knob 118.

As noted above, in one exemplary embodiment, the sensor processor 124 is an inductance-to-digital converter. The sensor processor 124 energizes an LC resonator that includes the inductive coil 146. When the conductor 144 is near the inductive coil 146, the conductor 144 and the inductive coil 146 inductively couple, causing eddy currents to flow into the sensor processor 124. The inductive coupling, and thus the eddy currents, varies with, among other things, the amount (area) of the conductor 144 that is overlapping the inductive coil 146. The sensor processor 124 is able to determine the eddy currents, and thus the area of the conductor 144, but measuring a resonant impedance parallel to the LC tank ($R_P$).

Figure 11:
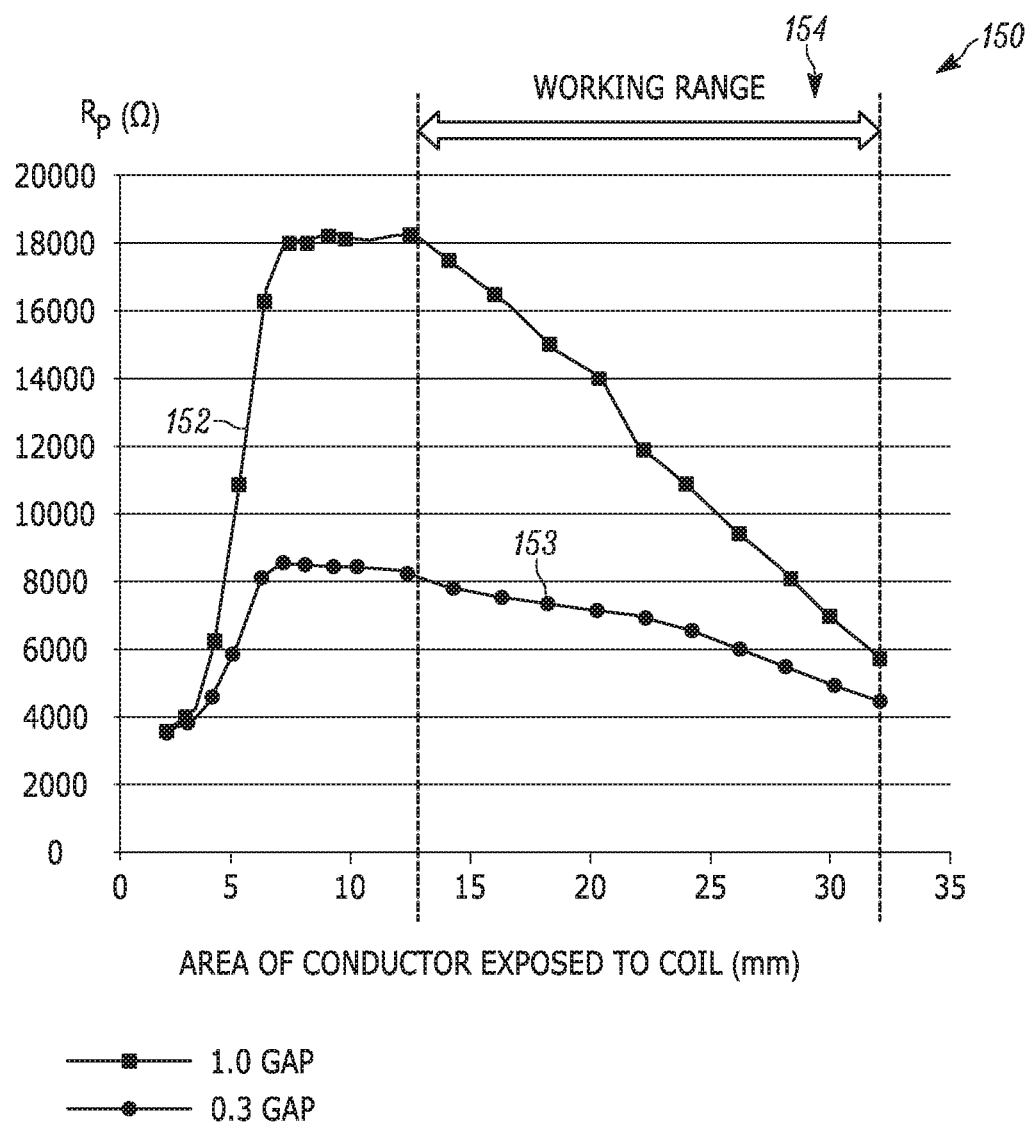
FIG. 11 is a line chart illustrating the relationship between parallel resonant impedance and the area of the conductor of FIG. 10 in accordance with some embodiments.

FIG. 11 is a line chart 150 that illustrates the relationship between the value of $R_P$ (in Ohms) and the area of the conductor 144. The line 152 shows the relationship between the parallel resonant impedance ($R_P$) and the area of the conductor 144 when the conductor 144 and the inductive coil 146 are positioned 0.3 millimeters apart. The line 153 shows the relationship between the parallel resonant impedance ($R_P$) and the area of the conductor 144 when the conductor 144 and the inductive coil 146 are positioned 1 millimeter apart. The greater slope of line 152, as compared with line 153, provides more variation in $R_P$ for each change in the area of the conductor 144. Accordingly, the embodiments described herein have a 0.3 millimeter gap between the conductor 144 and the first sensor 120 (when the knob 118 is in the first location 126) or the second sensor 122 (when the knob 118 is in the second location 128). Alternative embodiments may include gaps of other sizes. Effective gap sizes will vary with the size and shape of the conductor 144 and the inductive coil 146, and may be determined experimentally.

The linear relation between the area of the conductor 144 and the value of $R_P$ (in Ohms) may be used to establish a working range 154 for the knob 118. For example, in the illustrated embodiment, when sixteen steps are desired, seven hundred-fifty Ohms represents one step: (18,000Ω-6,000Ω)/16 steps=750 Ω/step. Accordingly, the electronic processor 102 can use the value of $R_P$, communicated to it by the sensor processor 124, to determine how many steps the knob 118 has been turned. The value of $R_P$ may also be used to determine the rotational angle for the conductor 144. For example, if the conductor 144 is divided sixteen portions (one for each step), each portion represents 22.5 degrees (that is, 360 degrees/16 steps=22.5 degrees).

Figure 12:
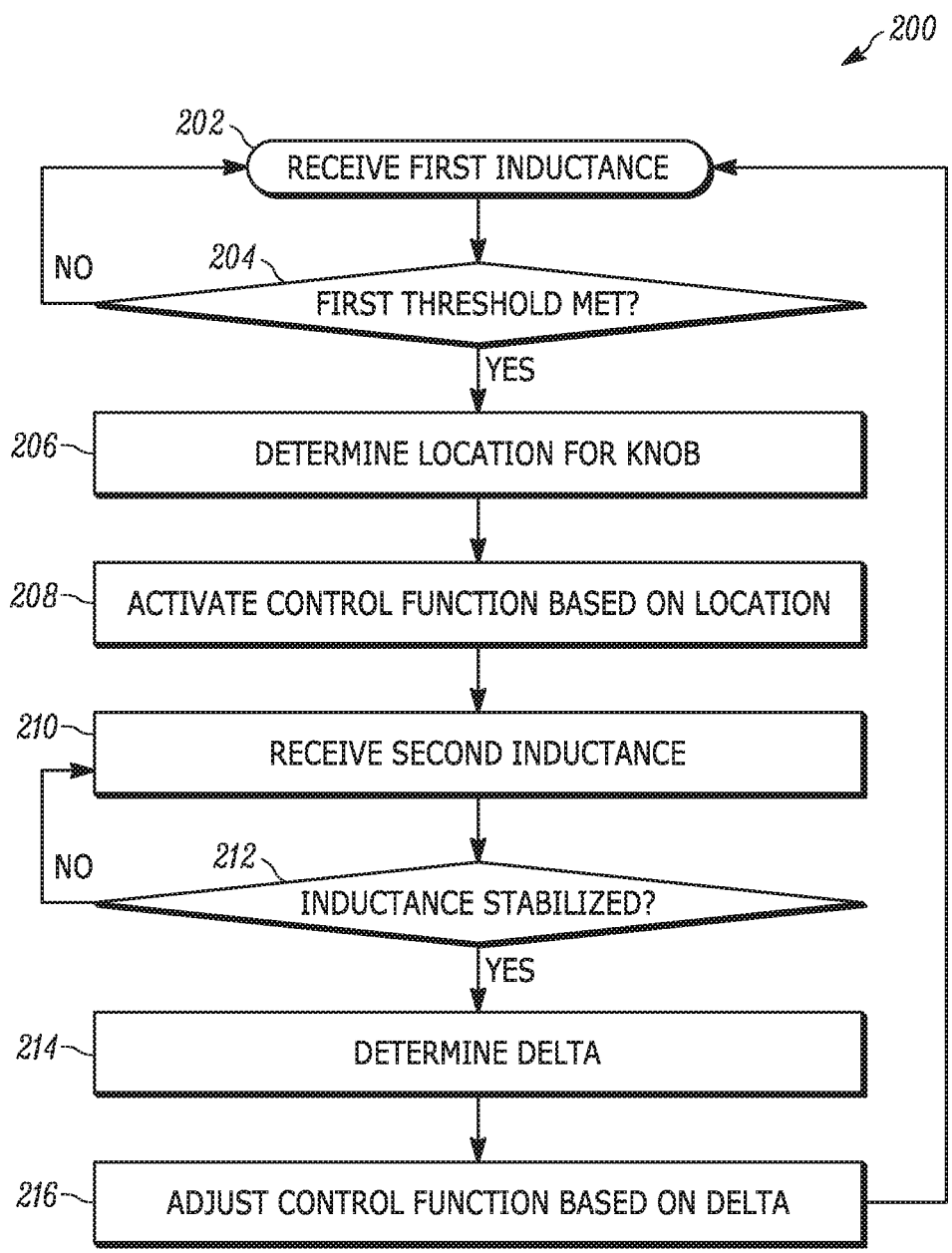
FIG. 12 is a flowchart of a method of operating the electronic device of FIG. 1 in accordance with some embodiments.

FIG. 12 illustrates an exemplary method 200 for operating the electronic device 100. As an example, the method 200 is described in terms of inductive sensing using two sensors and an inductance-to-digital converter. This should not be considered limiting; the concepts embodied in the example described may be applied to different types of sensing using two or more sensors. It should also be noted that, although the sensor processor 124 communicates a value for parallel impedance, that value is representative of a change in inductance caused by the conductor 144, and will thus be referred to in this example as an inductance.

At block 202, the electronic processor 102 receives a first inductance from the sensor processor 124. In some embodiments, the first inductance is pushed from the sensor processor 124 periodically. In other embodiments, the first inductance is received by the electronic processor 102 in response to a request made to the sensor processor 124. At block 204, the electronic processor 102 determines whether the first inductance meets a pre-determined threshold. In other words, the electronic processor 102 compares the first inductance to a threshold. The threshold is based on the minimum effect on the inductance of the inductive coil 146 caused by the conductor 144. When the threshold is not met, the electronic processor 102 determines that the conductor 144 is not causing the first inductance, and begins the method 200 again by receiving a first inductance at block 202.

When the threshold is met, the electronic processor 102 determines that the conductor 144 is causing the first inductance. At block 206, the electronic processor 102 determines the location for the knob 118. As described above, the knob 118 can be positioned in the first location 126, adjacent to the first sensor 120, or in the second location 128, adjacent to the second sensor 122 (FIG. 8). When the first inductance is generated by the first sensor 120 (first inductive coil) and it meets the threshold at block 204, the electronic processor 102 determines that the knob 118 is in the first position 126. When the first inductance is generated by the second sensor 122 (second inductive coil) and it meets the threshold at block 204, the electronic processor 102 determines that the knob 118 is in the second position 128.

Because the first inductance may be generated by either the first sensor 120 or the second sensor 122, blocks 202 through 206 are performed regardless of where the first inductance is generated. In some embodiments, the electronic processor 102 alternately receives an inductance from each of the first sensor 120 and the second sensor 122. In other embodiments, the electronic processor 102 receives and processes inductances from both sensors in parallel until it determines that one exceeds the threshold at block 204 (for example, compares each to a threshold).

At block 208, the electronic processor 102 activates a control function for the electronic device 100 based on the location of the knob 118. A control function is a function of the electronic device 100 which can be adjusted by a user of the electronic device using an input, such as the knob 118. In one example, the first location 126 may be assigned to volume control (for example, a first control function), while the second location 128 may be assigned to channel control (for example, a second control function). The electronic device 100 may have control functions beyond those specifically described.

At block 210, the electronic processor 102 receives a second inductance from the sensor processor 124. At block 212, the electronic processor 102 determines whether the second inductance has stabilized (that is, whether the knob 118 has stopped rotating). For example, the electronic processor 102 may determine that the second inductance has stabilized when its value remains stable for a predetermined period of time (for example, one second). When the electronic processor 102 determines that the second inductance has not stabilized, the electronic processor 102 continues receiving the second inductance at block 210.

When the electronic processor 102 determines that the second inductance has stabilized, the electronic processor 102 determines a delta (change in inductance) at block 214. In one exemplary embodiment, described above with respect to FIG. 11, the change in inductance caused by the conductor 144 may be expressed in terms of a change in parallel resonant impedance.

Figure 13:
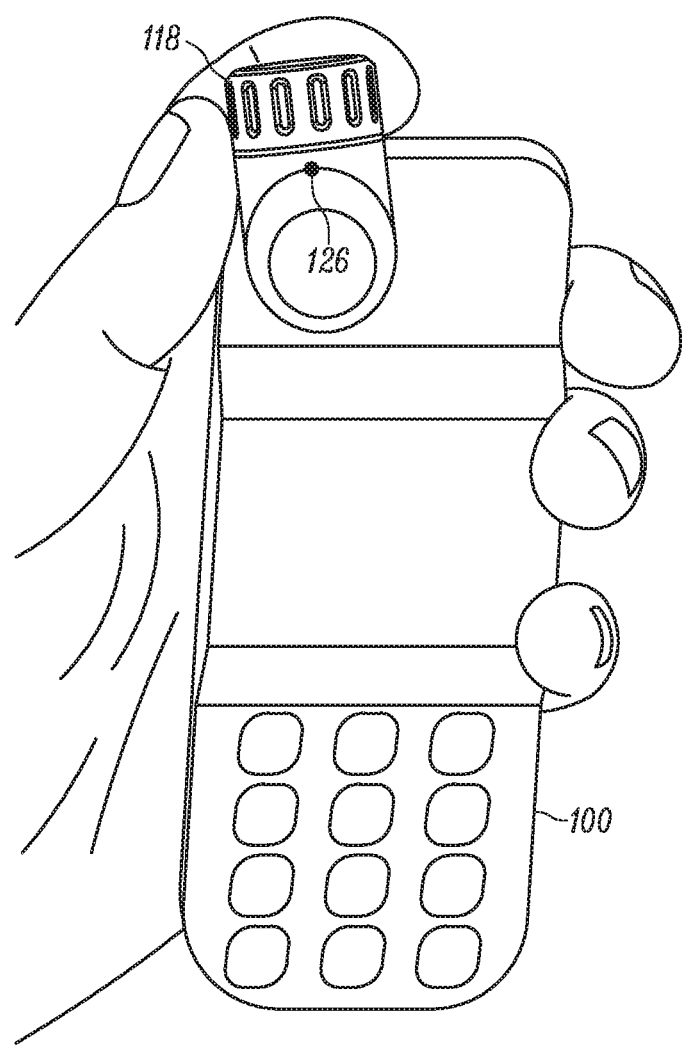
FIG. 13 is a perspective view of an electronic device with a rotary control in accordance with some embodiments.
Figure 14:
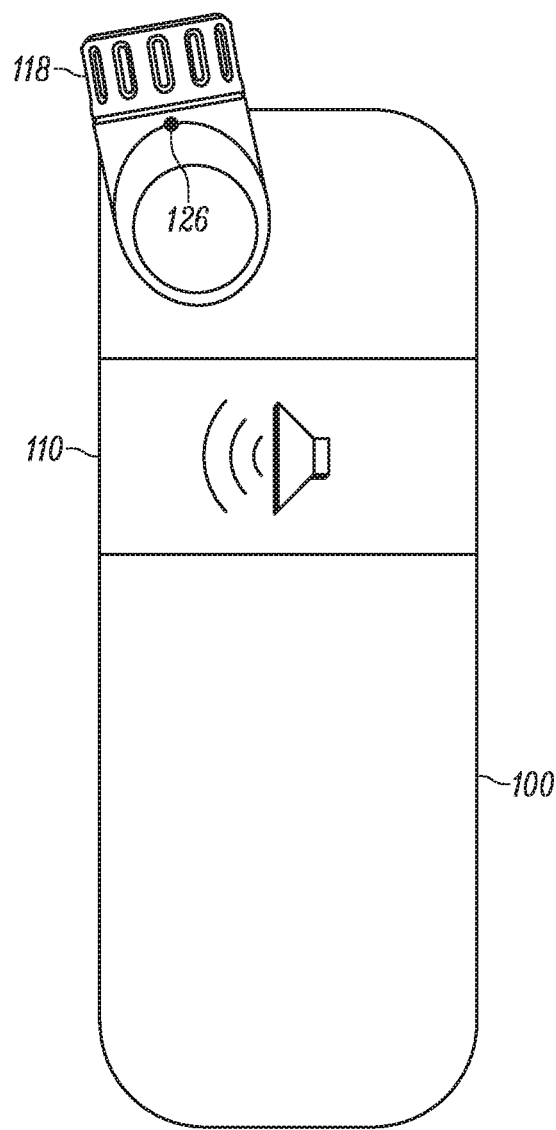
FIG. 14 is a front view of an electronic device with a rotary control in accordance with some embodiments.
Figure 15:
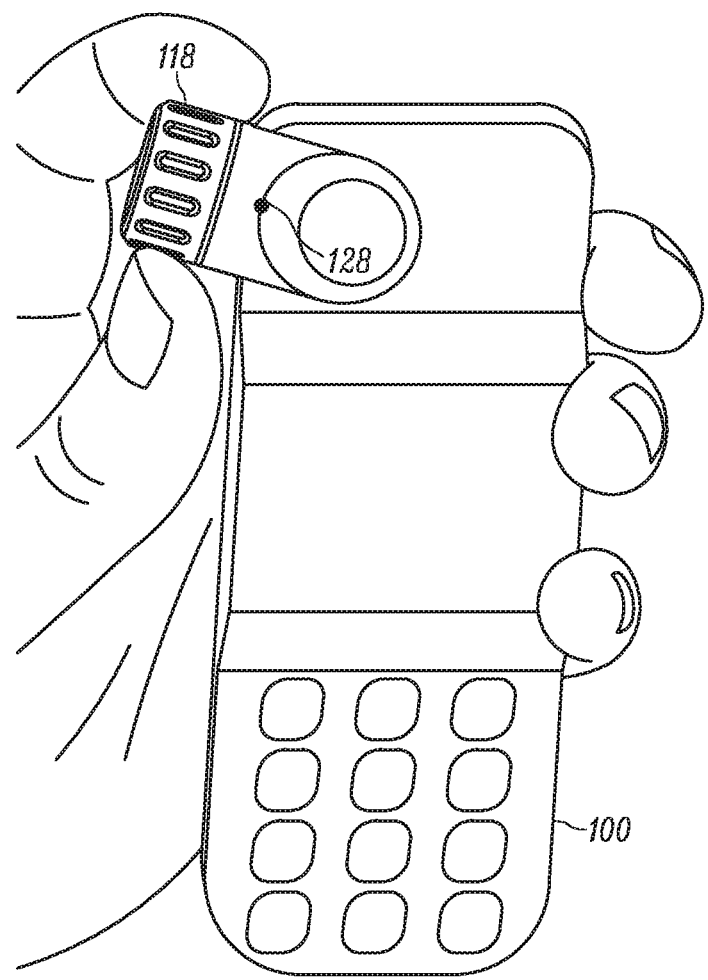
FIG. 15 is a perspective view of an electronic device with a rotary control in accordance with some embodiments.
Figure 16:
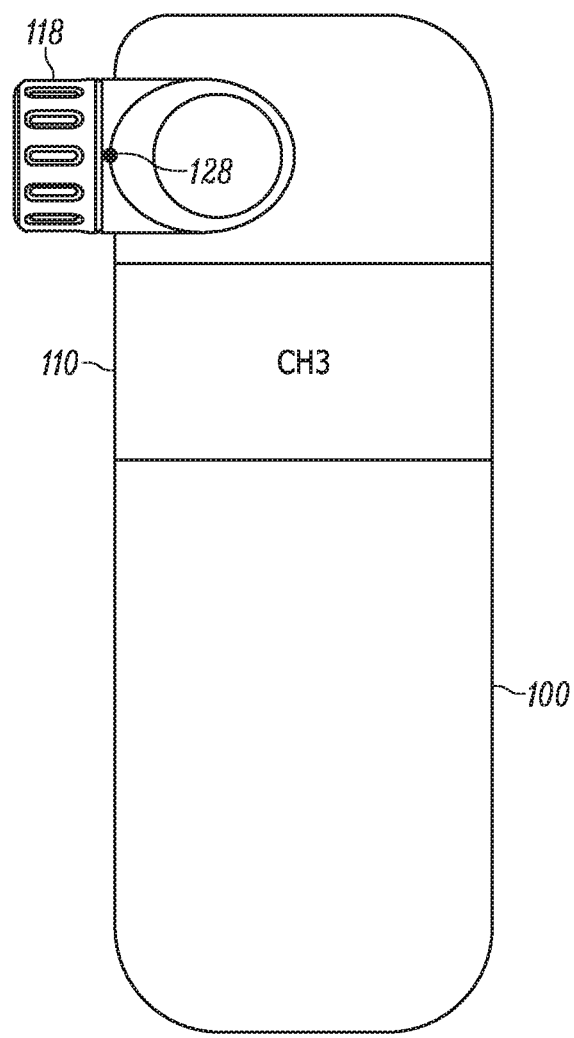
FIG. 16 is a front view of an electronic device with a rotary control in accordance with some embodiments.

Returning to FIG. 12, at block 216, the electronic processor 102 adjusts the control function activated at block 208, based in the delta. In one exemplary embodiment, the electronic processor 102 determines a step value based on the delta. In the exemplary embodiment, a positive delta indicates a positive step value, and a negative delta indicates a negative step value. For example, a delta of 2250 Ohms results in adjusting the control function three steps forward (2250/750=3), whereas a delta of −2250 Ohms would result in adjusting the control function three steps backward (−2250/750=−3). In one example, when the knob 118 is positioned in the first location 126 (FIG. 13), the electronic processor 102 uses the delta, generated by rotating the knob 118, to adjust the volume setting (FIG. 14). Likewise, when the knob 118 is positioned in the second location 128 (FIG. 15), the electronic processor 102 uses the delta, generated by rotating the knob 118, to adjust the channel setting (FIG. 16).

When the control function is adjusted, the electronic processor 102 begins the method again at block 202.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A rotary control for a portable communications device, the rotary control comprising:
   a knob having a longitudinal axis, the knob being pivotable about a pivot axis perpendicular to the longitudinal axis between a first location and a second location, and rotatable around the longitudinal axis;
   a first sensor located at the first location and configured to sense when the knob is in the first location; and
   a second sensor located at the second location and configured to sense when the knob is in the second location.

2. The rotary control as claimed in claim 1, wherein the knob is movable between the first location, the second location, and a third location, the third location located between the first location and the second location.

3. The rotary control as claimed in claim 1, wherein the knob includes at least one boss and the rotary control further comprises:
   a pin having disposed on the pivot axis;
   wherein the at least one boss is connected to the pin.

4. The rotary control as claimed in claim 3, further comprising:
   an annular conductor connected to the knob and rotatable around the longitudinal axis;
   wherein the first sensor includes a first inductive coil configured to sense a first inductance based on a rotational angle of the annular conductor; and
   the second sensor includes a second inductive coil configured to sense a second inductance based on the rotational angle of the annular conductor.

5. The rotary control as claimed in claim 4, wherein
   the first inductive coil has a teardrop shape that is proportional to the annular conductor; and
   the second inductive coil has a teardrop shape that is proportional to the annular conductor.

6. The rotary control as claimed in claim 1, wherein the knob includes a plurality of detents, the plurality of detents positioned such that the knob is rotatable around the longitudinal axis in a plurality of equal steps.

7. The rotary control as claimed in claim 4, further comprising:
   an electronic processor, electrically coupled to the first sensor and the second sensor, and configured to
   receive, from the first sensor, the first inductance;
   compare the first inductance to a first threshold;
   determine that the knob is in the first location when the first inductance exceeds the first threshold;
   receive, from the second sensor, the second inductance;
   compare the second inductance to a second threshold; and
   determine that the knob is in the second location when the second inductance exceeds the second threshold.

8. The rotary control as claimed in claim 7, wherein the processor is further configured to
   activate a first control function when the knob is in the first location;
   receive, from the first sensor, a third inductance;
   determine a first delta based on the first inductance and the third inductance; and
   adjust the first control function based on the first delta.

9. The rotary control as claimed in claim 7, wherein the processor is further configured to
   activate a second control function when the knob is in the second location,
   receive, from the second sensor, a fourth inductance;
   determine a second delta based on the second inductance and the fourth inductance; and
   adjust the second control function based on the second delta.

10. A method for controlling a portable communications device using a rotary control, the method comprising:
    receiving, by an electronic processor from an inductance sensor, a first inductance;
    comparing, by the electronic processor, the first inductance to a first threshold;
    determining, by the electronic processor, a location for the rotary control when the first inductance exceeds the first threshold;
    activating, by the electronic processor, a control function based on the location;
    receiving, by the electronic processor from the inductance sensor, a second inductance;
    determining, by the electronic processor, a delta based on the first inductance and the second inductance;
    adjusting, by the electronic processor, the control function based on the delta.

11. The method claimed in claim 10, wherein adjusting the control function includes one selected from a group consisting of adjusting a channel setting and adjusting a volume setting.

12. The method claimed in claim 10, further comprising:
    determining, by the electronic processor, a step value based on the delta;

wherein adjusting the control function based on the delta includes adjusting the control function based on the step value.

13. A portable electronic communications device comprising:
- a housing;
- an electronic processor;
- a rotary control coupled to the housing, including
  - a knob having a longitudinal axis, the knob being pivotable about a pivot axis perpendicular to the longitudinal axis between a first location and a second location, and rotatable around the longitudinal axis;
  - a first sensor located at the first location and configured to sense when the knob is in the first location;
  - a second sensor located at the second location and configured to sense when the knob is in the second location.

14. The portable electronic device claimed in claim 13, wherein the knob is movable between the first location, the second location, and a third location, the third location located between the first location and the second location.

15. The portable electronic device claimed in claim 13, wherein the knob includes at least one boss and the rotary control further comprises:
- a pin having disposed on the pivot axis perpendicular to the longitudinal axis;
- wherein the at least one boss is connected to the pin.

16. The portable electronic device claimed in claim 13, wherein the rotary control further comprises:
- an annular conductor connected to the knob and rotatable around the longitudinal axis;
- wherein the first sensor includes a first inductive coil configured to sense a first inductance based on a rotational angle of the annular conductor; and
- the second sensor includes a second inductive coil configured to sense a second inductance based on the rotational angle of the annular conductor.

* * * * *